Figure 1:
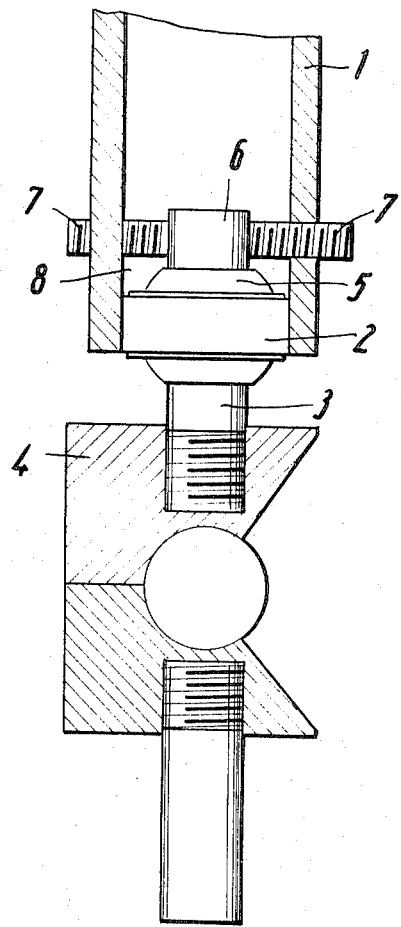

United States Patent [19]
Gelbenegger

[11] 3,790,965
[45] Feb. 12, 1974

[54] ANGLE ADJUSTMENT UNIT FOR PROSTHESES AND ORTHOSES

[76] Inventor: Franz Gelbenegger, Wulsdorfer weg 85, Hamburg-Volksdorf, Germany

[22] Filed: July 26, 1972

[21] Appl. No.: 275,434

[30] Foreign Application Priority Data
July 30, 1971 Germany.................. P 21 38 153.3

[52] U.S. Cl............................. 3/21, 287/12, 287/88, 3/22
[51] Int. Cl............................. A61f 1/08, A61f 1/04
[58] Field of Search.................. 3/21, 2, 22, 30–32; 287/12, 21, 87, 88

[56] References Cited
UNITED STATES PATENTS
3,659,294 5/1972 Glabiszewski............................. 3/21
973,558 10/1910 Pierce.............................. 287/12 X

FOREIGN PATENTS OR APPLICATIONS
978,586 12/1964 Great Britain........................... 3/21

Primary Examiner—Richard A. Gaudet
Assistant Examiner—Ronald L. Frinks
Attorney, Agent, or Firm—McGlew and Tuttle

[57] ABSTRACT

An angle adjustment unit for the angular positioning of a prosthesis or orthosis member with respect to a conventional prosthesis joint, comprising a commercial ball-and-socket joint coupled to the conventional prosthesis joint by means of a rod extending through the ball-and-socket joint and projecting at a free end portion into the prosthesis member. By means of screws threaded into the prosthesis member and engaging the free end portion of the rod the prosthesis member may be locked in any desired angular position with respect to the conventional prosthesis joint.

3 Claims, 3 Drawing Figures

ANGLE ADJUSTMENT UNIT FOR PROSTHESES AND ORTHOSES

This invention relates generally to prostheses and orthoses and more particularly to a novel and improved angle adjustment unit for the joint assemblies of such artificial limbs.

In the field of making prostheses and orthoses there has evolved an ever increasing need for the adjustment of the relative position of artificial joints while such joints are in operation, and heretofore this need has been met by mounting angle adjustment units on prostheses and orthoses above or below respectively of the joints thereof. The more and more used tubular skeleton type prostheses as well tubular type orthoses are well suited to effect corrections of posture if the angle adjustment unit is very small and can be mounted in the tube. Various types of angle adjustment units for adjusting the longitudinal prothesis axis are already known, such as clamping spheres which although allowing any desired angular position are capable of transmitting only a relatively small momentum and are of a very expensive design.

For the above reasons, some of the angle adjustment units currently employed have spherical support surfaces disposed at right angles to the longitudinal axis of the prostheses, and technical devices of various designs for mutually adjusting these support surfaces. Although assemblies of this type allow to transmit relatively high momentums, the angle adjustment units are of relatively big dimensions and of expensive designs.

Therefore there exists a need for an angle adjustment unit in the tubular skeleton of prostheses and orthoses which unit is very small, allows to transmit relatively high momentums and may be assembled from commercially available components so that the use of such units does not entail any unnecessary increase of costs in the making of prostheses and orthoses.

In accordance with the present invention, this need is met by the following expedients: The outer ring of a commercially available ball-and-socket joint is press-fitted into a tube that is suitable for interconnecting parts of prostheses and orthoses. Toward this end, a rod of circular cross-section is threadedly secured to a joint such as a prothesis knee-joint in such a manner that the rod projects by about 2 to 3 cms (about ¾ to 1 3/16 in.) from the top or the bottom of the prosthesis knee-joint. The diameter of the rod is chosen with respect to the inside diameter of the bore in the ball of the ball-and-socket joint such that the ball-and-socket joint may be press-fitted onto the rod. The commercial ball-and-socket joint forms an articulated connection in the gap defined between the rod and the tube and is frictionally secured to either of these parts. In practice, the rod is pressed so far into the ball-and-socket joint until the free rod end projects by at least 1 cm (approx. ⅜ in.) from the opposite side of the joint. In this manner, an omnidirectionally movable joint connection is formed between the prosthesis or orthosis joint and the skeleton tube. In the desired angular position of the prosthesis or orthosis longitudinal axis the rod is immobilized by means of three screws which threadedly engage the skeleton tube and project into the interior of this tube. These adjustment screws are adjusted to abut with their free inner ends the projecting free rod end. Preferably three screws are provided, because of the high clamping efficiency achieved thereby. Additionally, the surfaces of engagement of the screws with the rod may be suitably flattened or otherwise shaped.

This angle adjustment unit according to the present invention allows to transmit high momentums and to perform angular adjustments in any direction whereby the angle adjustment unit occupies a minimum of space.

Figure 2:
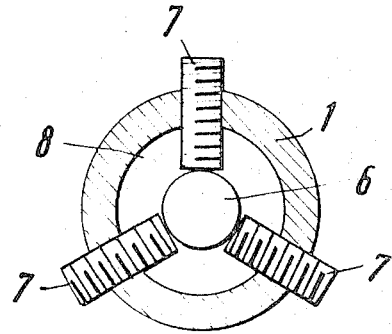
Figure 3:
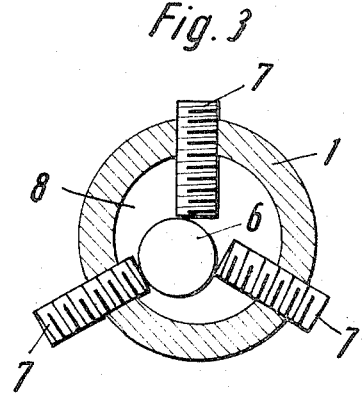

The present invention will be described more in detail in the following with reference to an illustrative embodiment shown in the appended drawing wherein FIG. 1 is a vertical cross-sectional view of an artificial knee-joint provided with an angle adjustment unit in accordance with the present invention;

FIG. 2 is a horizontal cross-sectional view of the same unit, taken in a plane extending through the three adjustment screws; and FIG. 3 is a view similar to FIG. 2 and illustrates an angular adjustment position different from the one of FIG. 2.

Referring to FIG. 1, a commercial type ball-and-socket joint 2 has been press-fitted into a tube 1 (forming part of a prosthesis not shown). A rod 3 which as shown in the illustrated embodiment may be threadedly engaged in an artificial knee-joint 4 is pressed through the bore in the ball 5 of the ball-and-socket joint 2 until the free rod end 6 projects by about 1 cm (approximately ⅜ in.) from the opposite side of the ball-and-socket joint 2. The annular gap 8 thus defined between the inner wall of the tube 1 and the outer wall of the rod 3 may be given any asymmetrical configuration by means of three adjustment screws 7 which threadedly engage the tube 1 in an angular spaced arrangement in one cross-sectional plane of this tube 1 and allow the fixing of the rod 3 in any desired angular position with respect to the tube 2.

What I claim is :

1. A device for use as a prosthesis and an orthosis particularly for a knee joint, comprising a hollow skeleton-type tubular prosthesis and orthosis, a universal joint including a socket housing having an exterior cylindrical surface press fitted within said tubular prosthesis adjacent an end thereof and having a ball member portion with an outer surface of a spherical configuration pivoted within said socket housing and having a bore extending completely therethrough, a connection rod extending through said ball member bore and having an inner end extending into said tubular prosthesis and orthosis and an opposite outer end extending outwardly from said tubular prosthesis and orthosis and adapted to be positioned for connection to another part, and a plurality of adjustment screws threaded through said tubular prosthesis and orthosis and bearing against the inner end of said rod at a plurality of locations spaced around the circumference and fixing the inner end of said rod at a selected position within said tubular prosthesis and orthosis so that the opposite outer end of said rod is positioned at a desired position for connection to another part.

2. A device according to claim 1, including a knee joint assembly, said outer end of said rod being threaded into said knee joint assembly.

3. A device according to claim 1, wherein said plurality of adjustment screws comprise three separate threaded screws extending generally radially through the wall of said tubular prosthesis and orthosis and being at 120° away from each other.

* * * * *